United States Patent
Viaud

(10) Patent No.: US 7,568,425 B2
(45) Date of Patent: Aug. 4, 2009

(54) ROUND BALER AND METHOD FOR ALTERING THE FRICTION ON ITS SIDE WALLS

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/950,646

(22) Filed: Dec. 5, 2007

(65) Prior Publication Data

US 2008/0223013 A1    Sep. 18, 2008

(30) Foreign Application Priority Data

Mar. 14, 2007    (DE)    ................ 10 2007 012 174

(51) Int. Cl.
*B30B 5/04*    (2006.01)
*A01D 39/00*    (2006.01)

(52) U.S. Cl. .............................. 100/87; 100/88; 56/341
(58) Field of Classification Search .................. 100/87, 100/88, 89, 177; 56/341, 344, 10.1
See application file for complete search history.

(56) References Cited

U.S. PATENT DOCUMENTS

| 4,334,467 A | 6/1982 | Nishibe et al. |
| 4,370,848 A | 2/1983 | Campbell et al. |
| 4,450,764 A * | 5/1984 | Montgomery ................ 100/37 |
| 7,114,435 B2 * | 10/2006 | Viaud et al. ................... 100/88 |

FOREIGN PATENT DOCUMENTS

| DE | 27 39 935 | 3/1979 |
| DE | 39 20 377 | 1/1991 |
| EP | 1 364 574 | 4/2003 |

OTHER PUBLICATIONS

European Search Report, Jul. 9, 2008, 5 Pages.

* cited by examiner

*Primary Examiner*—Jimmy T Nguyen

(57) ABSTRACT

A round baler has a frame to which side walls of a baling chamber are fixed. The frame or parts of it can be moved farther apart or closer together by a linear power motor in order to control the friction between a round bale and the side walls.

4 Claims, 2 Drawing Sheets

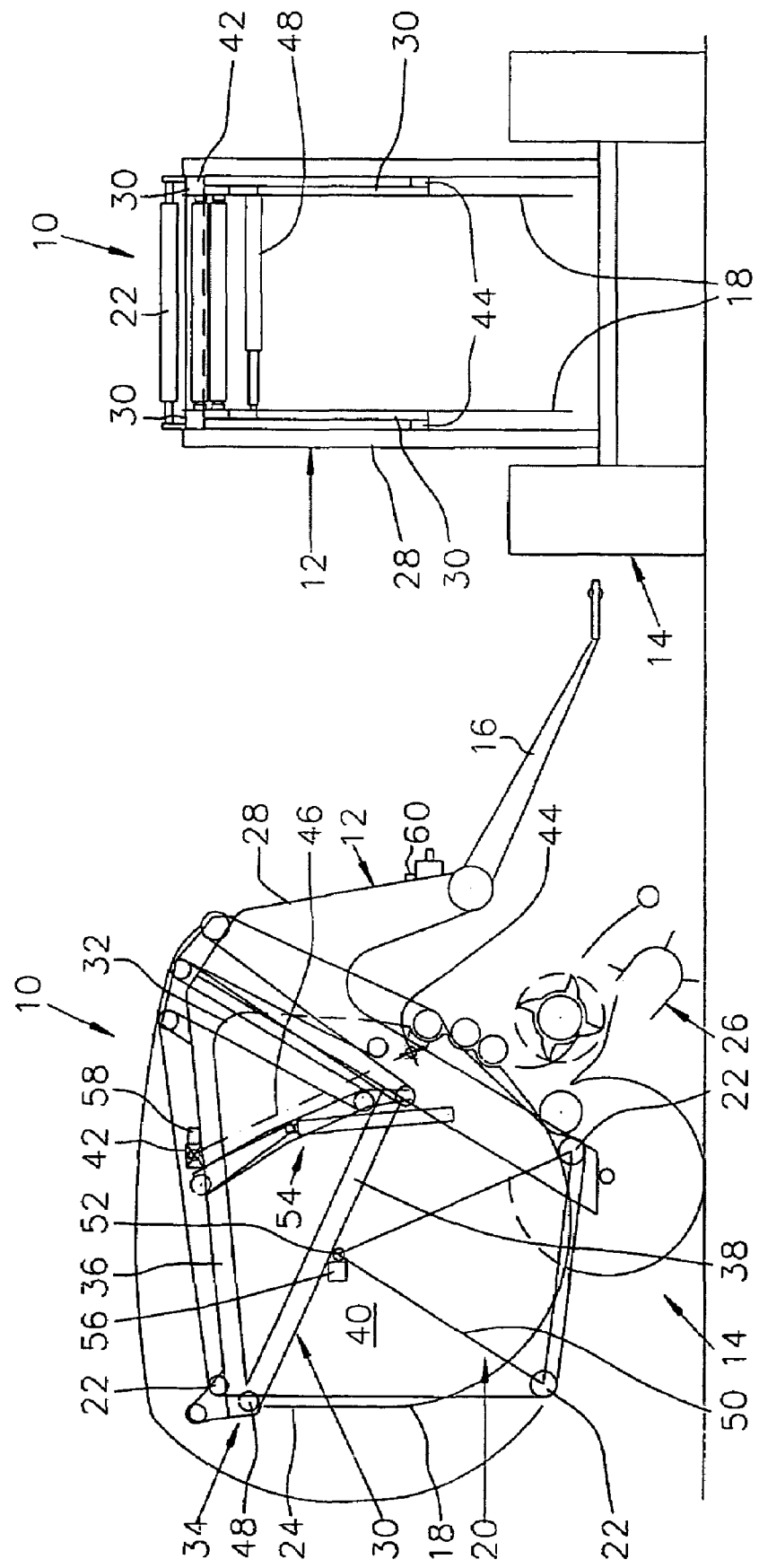

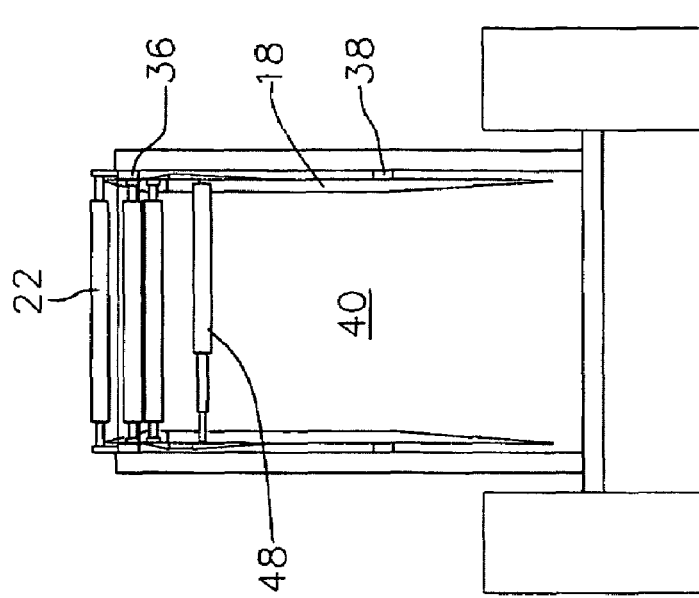
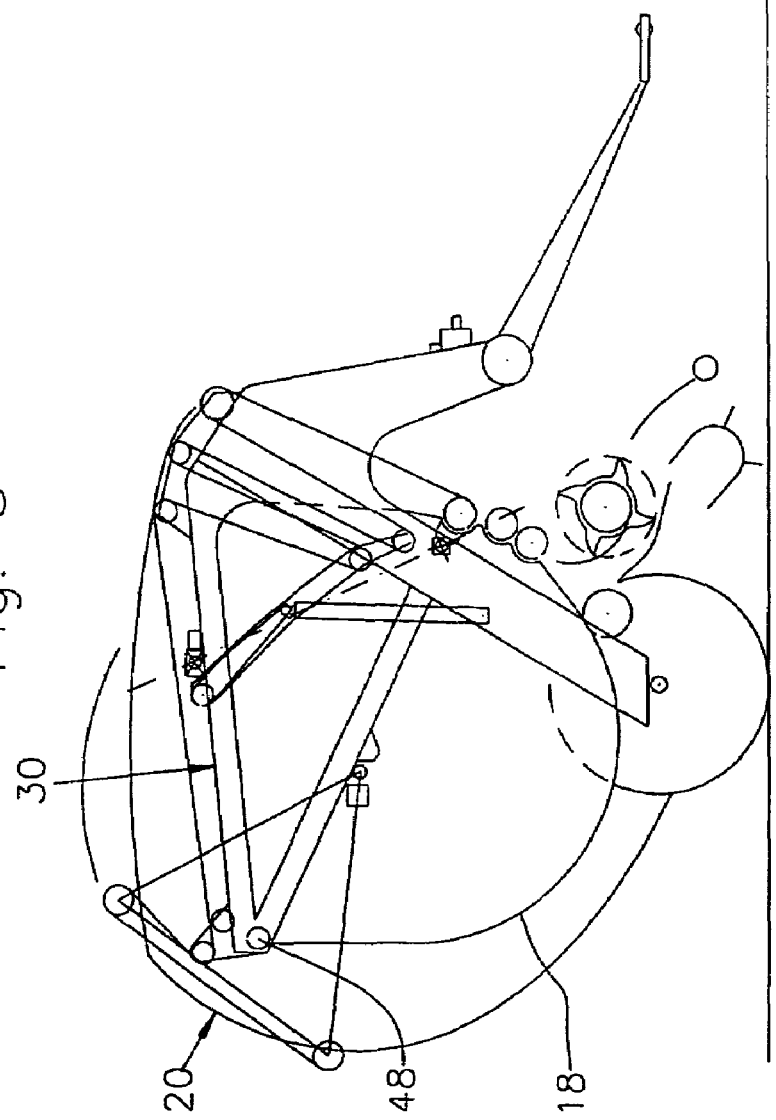

ROUND BALER AND METHOD FOR ALTERING THE FRICTION ON ITS SIDE WALLS

FIELD OF THE INVENTION

The invention relates to a round baler having a frame for receiving side walls of a baling chamber and a method for altering the friction between the side walls of a round baler and the end faces of a round bale formed in a baling chamber.

BACKGROUND OF THE INVENTION

From EP A 1364574, it is known to mount side walls of a round baler movably relative to a frame, so that they can be moved farther apart or closer together. The movement is induced by vertically pivotable arms, which are raised to open the baling chamber. As the baling chamber is opened, the side walls are moved farther apart in order that the friction upon the end faces of the round bale decreases and the round bale can thus be more easily ejected.

SUMMARY OF THE INVENTION

The problem on which the invention is based is seen in obtaining this beneficial effect of the prior art with a lower technical complexity.

In this way, there is no need for any dedicated mounting and adjusting device for the side walls, since these are rigidly fastened to the frame and its parts. Instead, the frame as a whole or in the outlet-side region is expanded, whereby the friction on the end-face sides of the round bale is in turn reduced. Mechanical adjusting devices with anti-friction surfaces are wholly dispensed with. It may be sufficient for only one side of the frame to be moved away. A movement in the single-digit centimeter range is enough to obtain the effect.

The technical complexity is least when the parts supporting the side walls can be moved relative to one another by exploiting the material elasticity of the frame or of the parts. The frame of the round baler is configured in top view substantially like a horizontal "U", so that both the crosspiece and the two legs of the "U" can be bent by a few degrees. The correct elasticity is achieved by the shaping of the crosspiece and of the legs of the "U", in which case material surfaces which run, in particular, in the direction of bending must be configured accordingly.

The frame or its parts can also be divided into zones of different stiffness, so that the less stiff zones form an imaginary pivot axis about which the parts with the side walls are moved. These zones can be formed by virtue of a different heat treatment, wall thicknesses, crosspiece heights and the like. While these zones can be configured in a one-piece part, it is also possible to create such zones by transitions or connections to the parts. By means of stiffeners or other stays, for example, parts of the frame can also be rigidly connected, so that the frame or the parts in the connection region of the stiffeners are of very stiff configuration.

A simple embodiment of the invention consists in the use of a joint on at least one of the parts, which joint can be produced both with a pivot point and with a flexible joint plate or the like.

Since the frame and the parts are of relatively strong configuration, it is sensible to effect the movement of the parts by power means, for example by hydraulic, pneumatic or electric motors, which act directly or via rods or Bowden cables upon those parts of the frame which are to be adjusted. In this context, a solution in which a hydraulic motor is clamped in place between the free ends of the two legs of the "U" is undoubtedly the simplest.

The one or more power means can adjust the parts whenever a bale is ejected in order to ensure its exit; they can also, however, be loaded during operation in dependence on the friction determined on the side walls by means of sensors. In this way, the power requirement for the driving of the round baler can be controlled, slippage at the compression belts or rollers can be prevented, and the bale density can also possibly be influenced.

The frame or its parts can be brought into each of its/their end settings by means of the power means; however, they can also always assume an inner or outer end setting and be moved out of this by means of the power means.

In order that both a greater adjustment of the parts with the side walls is possible and that loads upon the bearings of the belt guide rollers, of drive shafts and the like do not arise, the bearings are configured or fitted such that on their inner or outer race an axial movement is possible.

A method for achieving the respectively desired friction is based on predefined desired values which have been drawn up, for example, for the discharging process of the round bale, for the baling process or for the mesh-binding process. Then either the actual value on which the desired values are based is determined, for example the setting of a baling chamber door, or the friction between the round bale and the side walls. Finally, a control signal for a power means is generated, which latter adjusts the frame or its parts accordingly. The friction during the baling operation can be determined from the heat development on the side walls, from the deflection of the side walls, the forces acting upon the power means, the motional resistance of the belts, the power requirement necessary to operate the round baler, and the like. The baling chamber door can be constituted both by a door of traditional construction, which is movable about a top-situated pivot axis, or by a door which is pivotable about an axis situated substantially in the middle of the baling chamber.

BRIEF DESCRIPTION OF THE DRAWINGS

An illustrative embodiment of the invention, which is described in greater detail below, is shown in the accompanying drawings, wherein:

FIG. 1 is a schematic side view of round baler in a setting for the baling operation;

FIG. 2 is the round baler according to FIG. 1 in a view from the rear;

FIG. 3 is the round baler according to FIG. 1 in a setting for the bale-discharging operation; and, FIG. 4 is the round baler according to FIG. 2 in the setting for the bale-discharging operation.

DESCRIPTION OF THE PREFERRED EMBODIMENT

A round baler 10 shown in FIG. 1 contains a frame 12, a chassis 14, a drawbar 16, side walls 18, a baling chamber door 20, rollers 22, compression means 24 and a feed unit 26.

The represented round baler 10 is configured such that it can form round bales of different diameter; this is not compulsory, however, since the invention can also be used in round balers of the kind which produce equal-sized round bales. Otherwise the round baler 10 functions like other round balers.

The frame 12 includes a front part 28, which extends substantially vertically and fixedly connects the chassis 14 to the drawbar 16; for this purpose, it has a post or the like on each side of the round baler. In the present illustrative embodiment, this front part is configured with the chassis 14 and the drawbar 16 as a rigid unit and forms the actual supporting structure of the round baler 10; in another illustrative embodiment, the front part 28 can itself be flexibly configured and can thus be forced apart.

The frame 12 additionally includes fore-and-aft extending left and a right parts 30, which in side view, in this illustrative embodiment, are each configured almost as a right-angled triangle. These parts 30 are connected with their front end region to the front part 28, to be precise either movably, via joints, screw connections, resilient plates, or in a welded arrangement, as in the present case. The smallest side member 32 of the triangle, which is only indicatively present, substantially overlaps with the front part 28, or alternatively is formed by the latter, or, in another embodiment, bears against its inner face. A corner region 34 of the triangle is located at a upper corner region of the round baler 10, so that an upper side member 36, the hypotenuse or, in any event, the longest side member, runs almost horizontally. The middle or medium-sized side member 38 extends rearwards and upwards from a mid-height location on the front part 28 to the corner region 34, via the middle region of a baling chamber 40. The parts 30 are connected to each other, almost on half of their fore-and-aft extending length by an upper stiffener 42, which is welded or screwed to the upper side members 36. In addition, on each side, a lower stiffener 44 is provided, which respectively connects the right and left parts 30 rigidly to the front part 28. The connection of the parts 30 by means of the stiffener 42 and their rigid connection to the front part 28 by means of the stiffeners 44 results in the frame 12 not being able to be bent apart in the region of the stiffeners 42, 44; an imaginary pivot axis 46 running through the two stiffeners 42, 44 is therefore obtained with a major resilient zone of the left and right parts 30 and the attached left and right side walls 18 being thus defined rearward of the imaginary pivot axis 46. The position of the stiffeners 42, 44 can be chosen such that the pivot axis 46 is at a desired location, whereby the motional behavior of the parts 30 can be influenced. In particular, the position of the stiffeners 42, 44 can be altered according to the round baler model.

Between the corner regions 34 of the two parts 30 there is disposed a power means 48, which in the present illustrative embodiment is configured as a linear hydraulic motor, a so-called hydraulic cylinder, and can be retracted and extended, a small stroke of just a few centimeters being sufficient. Since the power means 48 actively operates only in one direction, in the case of a hydraulic or pneumatic motor it can take the form of a single-acting type. In the present illustrative embodiment, the alignment of the parts 30 is chosen such that in a normal position they and the attatched side walls 18 run parallel to one another, i.e. the power means 48 is extendible when pressurized to force the parts 30 apart to a deflected position, wherein they and the attached side walls diverge rearwardly from each other and is thereafter retracted by virtue of the elasticity of the parts 30 when the pressure is exhausted so that there is zero pressure. Because of the arrangement of the power means 48 in the corner regions 34, a large lever arm is obtained and, thus, does not need to apply high forces; clearly, the power means 48 could also act upon another location, in which case, however, regard would have to be paid to possible torsional forces or flexions in other directions.

The side walls 18 are configured as single-part or multipart panels with external reinforcements, which extend substantially over the cross section of the baling chamber 40. The side walls 18 are screwed or welded onto the inner sides of the parts 30 and delimit the baling chamber 40 at the end faces of a round bale (not shown). Owing to the connection of the side walls 18 to the parts 30, the side walls 18 also move when the parts 30 are forced apart, and thus away from the end faces of the round bale, whereby the friction on the side walls 18 is reduced or even eliminated.

The baling chamber door 20 contains two triangular swivel frames 50, which can be pivoted by means of actuating means (not shown, but known per se) about a bearing 52 in the middle region of the baling chamber 40 vertically out of a lower setting shown in FIG. 1 into an upper setting shown in FIG. 3. In the lower region of the swivel frames 50, rollers 22 are provided, which run transversely to the longitudinal centre plane of the round baler 10 and over which the compression means 24 can run and support the round bale—they, too, are part of the baling chamber door 20. In the lower setting of the swivel frames 50, these, with the rollers 22 and the compression means 24, close off the baling chamber 20 in the downward direction. When the baling chamber door 20 is swung upwards, the rollers 22 and those strands of the compression means 24 which run over them free up the baling chamber 40 in the downward direction. The swivel frames 50 run on the outer side of the side walls 18, where the bearings 52, too, are located; the rollers 22 supported on the swivel frames 50 extend, however, beyond the contour of the side walls 18. Since the bearings 52 are located on the side walls 18 or, alternatively, on the lower, middle side members 38 of the parts 30, they, too, jointly move when the parts 30 are forced apart; in this case, either the bearings 52 in the swivel frames 50 can move axially or the latter are likewise bent slightly outwards.

The rollers 22 are provided both on the swivel frames 50 and on the side walls 18, but also on a tensioning device 54, which is located in the front upper region of the round baler 10 and has tensioning arms, springs and the like, as this is known per se. Further rollers 22 are provided in a likewise known manner in the region of the feed unit 26. In total, the rollers 22 serve to support, drive and divert the band-like compression means 24. The rollers 22 situated in the region of the parts 30 are mounted such that a movement of the parts 30 in the direction of longitudinal extent of the rollers 22 is possible, which can be achieved, for example, with plain bearings and the like.

The compression means 24 are configured as continuous belts or bar chains and run according to the drawing and in a manner which is known per se over the rollers 22. The baling chamber 40 could also be surrounded by fixedly or movably fitted rollers 22, as is likewise known in the prior art. The compression means 24 form a loop, which extends from the feed unit 26 and in which the baling chamber 40 is formed and the received material to be compressed is rolled up into a round bale, which is delimited at its end faces by the side walls 18.

The feed unit 26 includes in this case a so-called pick-up and a feed rotor without a cutting device; these stand purely illustratively for a multiplicity of other feed units 26, which are known in their entirety and need no further description.

On the round baler 10 there are provided in this case three sensors, whereof a sensor 56 detects the setting of the baling chamber door 20, a sensor 58 detects the tension prevailing in the frame 12 in the direction of the rotational axis of the round bale and a sensor 60 detects the power requirement for the drive. By means of at least one of these sensors 56, 58, 60 and a control device, it is possible to determine the potential magnitude of the friction on the side walls 18 and to set a desired value. Likewise, the discharging process for discharging the round bale from the baling chamber 40 can be detected and tracked, whereupon a signal is transmitted to the power means 48 to widen the baling chamber 40 so as to reduce the friction.

Having described the preferred embodiment, it will become apparent that various modifications can be made without departing from the scope of the invention as defined in the accompanying claims.

The invention claimed is:

1. A round baler having a frame; said frame including a front part, and transversely spaced, fore-and-aft extending left and right parts having front end regions connected to the front part; left and right side walls being respectively fixed to said left and right parts of said frame and respectively defining left and right ends of a baling chamber, said bailing chamber is positioned between said left and right parts; said left and right parts of the frame and the attached left and right side walls including major resilient rearward zones that are deflectable between normal positions wherein the left and right parts and attached side walls extend parallel to each other, and deflected positions wherein they diverge rearwardly from each other; and a linearly extendable and retractable power actuator having opposite ends coupled to rear regions of said rearward zones of said left and right parts of the frame for moving said parts that support the side walls between said normal and deflected positions.

2. The round baler according to claim 1, wherein said left and right parts of said frame are joined to a stiffener arrangement located forward of said major resilient rearward zones.

3. The round baler according to claim 1, wherein said right and left parts supporting the side walls are each generally in the shape of a right triangle having a generally horizontal hypotenuse located at a top of the baling chamber and extending to a rear corner of the associated one of the left and right parts; and said actuator being coupled between the rear corners of said right and left parts.

4. A round baler according to claim 1, wherein said baling chamber is further delimited by structure including at least one roller extending between and mounted to said rearward zones of said left and right parts by bearings carried by said rearward zones of said left and right parts, with said bearings being configured to allow axial movement, thus permitting said left and right parts to be deflected outwardly.

* * * * *